US012785089B2

(12) United States Patent
Mitsui et al.

(10) Patent No.: US 12,785,089 B2
(45) Date of Patent: Nov. 3, 2026

(54) ELECTRODE LAYER AND ALL-SOLID STATE BATTERY

(71) Applicant: TOYOTA JIDOSHA KABUSHIKI KAISHA, Toyota (JP)

(72) Inventors: Akio Mitsui, Anjo (JP); Yasunari Sugita, Osaka (JP); Kenji Nagao, Toyota (JP); Izuru Sasaki, Kyoto (JP); Yasutaka Tsutsui, Osaka (JP); Takaaki Tamura, Mishima-gun (JP); Hiroki Kamitake, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 713 days.

(21) Appl. No.: 17/976,456

(22) Filed: Oct. 28, 2022

(65) Prior Publication Data

US 2023/0231122 A1 Jul. 20, 2023

(30) Foreign Application Priority Data

Jan. 17, 2022 (JP) ................................ 2022-004965

(51) Int. Cl.

| | |
|---|---|
| ***H01M 4/485*** | (2010.01) |
| ***H01M 4/38*** | (2006.01) |
| ***H01M 4/48*** | (2010.01) |
| ***H01M 4/587*** | (2010.01) |
| ***H01M 4/62*** | (2006.01) |
| ***H01M 10/0525*** | (2010.01) |
| ***H01M 10/0562*** | (2010.01) |

(52) U.S. Cl.

CPC ........... *H01M 4/485* (2013.01); *H01M 4/386* (2013.01); *H01M 4/48* (2013.01); *H01M 4/587* (2013.01); *H01M 4/622* (2013.01); *H01M 4/623* (2013.01); *H01M 10/0562* (2013.01); *H01M 10/0525* (2013.01); *H01M 2300/002* (2013.01); *H01M 2300/0068* (2013.01); *H01M 2300/008* (2013.01)

(58) Field of Classification Search

CPC ........ H01M 4/485; H01M 4/386; H01M 4/48; H01M 4/587; H01M 4/622; H01M 4/623; H01M 10/0562; H01M 10/0525; H01M 2300/002; H01M 2300/0068; H01M 2300/008; H01M 10/052; H01M 4/13; H01M 4/62; H01M 10/058; H01M 4/131; H01M 4/139; H01M 4/525; H01M 2004/021; Y02E 60/10

See application file for complete search history.

(56) References Cited

U.S. PATENT DOCUMENTS

| | | | | |
|---|---|---|---|---|
| 2021/0083323 | A1 | 3/2021 | Mimura | |
| 2021/0305627 | A1 * | 9/2021 | Tsutsui | .............. H01M 10/0585 |

FOREIGN PATENT DOCUMENTS

| | | | |
|---|---|---|---|
| JP | 2020161364 A | * | 10/2020 |
| JP | WO2020/022195 A1 | | 4/2021 |
| WO | 2020/136975 A1 | | 7/2020 |

OTHER PUBLICATIONS

Mitsunaga et al., JP 2020-161364; Espacenet machine translation, 2020 (Year: 2020).*

* cited by examiner

*Primary Examiner* — Adam A Arciero
(74) *Attorney, Agent, or Firm* — Oliff PLC

(57) ABSTRACT

There is provided an electrode layer for an all-solid state battery, which contains an electrode active material and a sulfide solid electrolyte, where the sulfide solid electrolyte has an average particle diameter of less than 1 μm and the electrode layer contains an imidazoline-based dispersion material.

15 Claims, 1 Drawing Sheet

ELECTRODE LAYER AND ALL-SOLID STATE BATTERY

CROSS-REFERENCE TO RELATED APPLICATION

This application claims priority to Japanese Patent Application No. 2022-004965 filed on Jan. 17, 2022, incorporated herein by reference in its entirety.

BACKGROUND

1. Technical Field

The present disclosure relates to an electrode layer and an all-solid state battery.

2. Description of Related Art

An all-solid state battery is a battery having a solid electrolyte layer between a positive electrode layer and a negative electrode layer, and it has the advantage that a safety device can be easily simplified as compared with a liquid-based battery having an electrolytic solution containing a flammable organic solvent. For example, Japanese Unexamined Patent Application Publication No. 2020-161364 (JP 2020-161364 A) discloses an all-solid state lithium secondary battery in which a surface roughness Ra at an interface between a positive electrode mixture layer and a solid electrolyte layer is 1.0 μm or less. Further, J P 2020-161364 A discloses that an imidazoline-based dispersion material is used in a positive electrode mixture layer or a negative electrode mixture layer.

SUMMARY

From the viewpoint of improving the performance of an all-solid state battery, an electrode layer having a low internal resistance has been demanded. The present disclosure provides an electrode layer having a low internal resistance.

A first aspect of the present disclosure relates to an electrode layer for an all-solid state battery. The electrode layer contains an electrode active material and a sulfide solid electrolyte, where the sulfide solid electrolyte has an average particle diameter ($D_{50}$) of less than 1 μm, and the electrode layer contains an imidazoline-based dispersion material.

According to the first aspect of the present disclosure, since a sulfide solid electrolyte having an average particle diameter ($D_{50}$) in a predetermined range and an imidazoline-based dispersion material are used, an electrode layer having a low internal resistance is obtained.

In the first aspect of the present disclosure, the electrode layer may further contain a rubber-based binder.

In the first aspect of the present disclosure, the electrode active material may contain at least one of a transition metal oxide-based active material, a Si-based active material, and a carbon-based active material.

In the first aspect of the present disclosure, the electrode layer may be a positive electrode layer.

In the first aspect of the present disclosure, the electrode layer may be a negative electrode layer.

In the first aspect of the present disclosure, in a case where the content of the electrode active material is set to 100 parts by weight, the content of the imidazoline-based dispersion material may be 0.005 parts by weight or more and 0.5 parts by weight or less.

In the first aspect of the present disclosure, the electrode layer is a positive electrode layer, and the content of the imidazoline-based dispersion material may be 0.01 parts by weight or more and 0.135 parts by weight or less.

In the first aspect of the present disclosure, the electrode layer further contains a binder, where the distance calculated from Hansen solubility parameters of the sulfide solid electrolyte and the imidazoline-based dispersion material may be smaller than the distance calculated from Hansen solubility parameters of the sulfide solid electrolyte and the binder.

In the first aspect of the present disclosure, the electrode layer further contains a binder, where the distance calculated from Hansen solubility parameters of the electrode active material and the imidazoline-based dispersion material may be smaller than the distance calculated from Hansen solubility parameters of the electrode active material and the binder.

In addition, a second aspect of the present disclosure relates to an all-solid state battery having a positive electrode layer, a negative electrode layer, and a solid electrolyte layer arranged between the positive electrode layer and the negative electrode layer. The all-solid state battery to be provided is an all-solid state battery in which at least one of the positive electrode layer and the negative electrode layer is the electrode layer described above.

According to the aspect of the present disclosure, since the electrode layer is used, an all-solid state battery having a low internal resistance is obtained.

According to the aspect of the present disclosure, it is possible to obtain an effect that an electrode layer having a low internal resistance can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
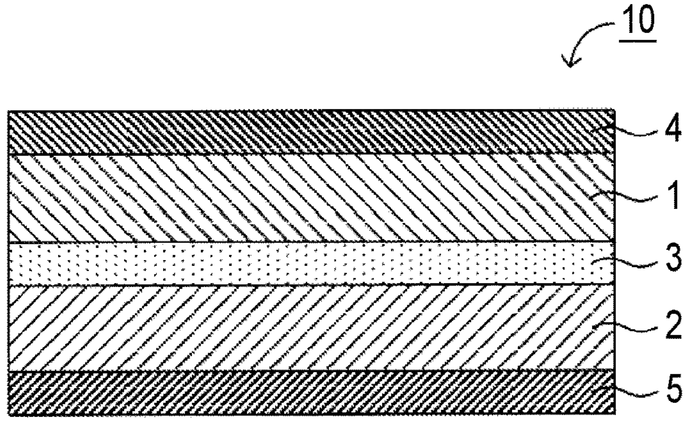
FIG. 1 is a schematic cross-sectional view exemplarily illustrating an all-solid state battery in the present disclosure.

Hereinafter, an electrode layer and an all-solid state battery in the present disclosure will be described in detail.

A. Electrode Layer

The electrode layer in the present disclosure is an electrode layer that is used in an all-solid state battery, where the electrode layer contains an electrode active material and a sulfide solid electrolyte, the sulfide solid electrolyte has an average particle diameter ($D_{50}$) of less than 1 μm, and the electrode layer contains an imidazoline-based dispersion material.

According to the present disclosure, since a sulfide solid electrolyte having an average particle diameter ($D_{50}$) in a predetermined range and an imidazoline-based dispersion material are used, an electrode layer having a low internal resistance is obtained. As will be described in Examples to be described later, in a case where the average particle diameter ($D_{50}$) of the sulfide solid electrolyte is set to less than 1 μm, and the sulfide solid electrolyte is used in combination with an imidazoline-based dispersion material, the internal resistance is significantly reduced. The reason for the above result is presumed to be because since the average particle diameter ($D_{50}$) of the sulfide solid electrolyte is set to be less than 1 μm, and the sulfide solid electrolyte is used in combination with the imidazoline-based dispersion material, a good joining interface is formed at the interface between the electrode active material and the sulfide solid electrolyte, and thus the interface resistance is significantly reduced.

1. Imidazoline-Based Dispersion Material

The electrode layer in the present disclosure contains an imidazoline-based dispersion material. The imidazoline-based dispersion material is a dispersion material having an imidazoline skeleton (a nitrogen-containing heterocyclic structure derived from imidazole). The electrode layer may contain solely one kind of imidazoline-based dispersion material or may contain two or more kinds thereof. Examples of the imidazoline-based dispersion material include a compound represented by the following general formula.

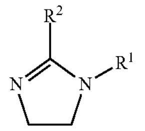

In the above general formula, $R^1$ is an alkyl group or a hydroxyalkyl group. The number of carbon atoms of $R^1$ is, for example, 1 or more and 22 or less. The hydroxyalkyl group may have a hydroxyl group bonded to the terminal carbon atom on the side opposite to the carbon atom bonded to N. Further, in the above general formula, $R^2$ is an alkyl group or an alkenyl group. The number of carbon atoms of $R^2$ is, for example, 10 or more and 22 or less. The position and number of double bonds in the alkenyl group are not particularly limited. Specific examples of the compound represented by the above general formula include 1-hydroxyethyl-2-alkenylimidazoline (for example, DISPER BYK-109 manufactured by BYK Additives & Instruments).

In the electrode layer, the content of the imidazoline-based dispersion material is, for example, preferably 0.005 parts by weight or more and 0.5 parts by weight or less in a case where the content of the electrode active material is set to 100 parts by weight. In a case where the electrode layer is the negative electrode layer, the content of the imidazoline-based dispersion material may be, for example, 0.01 part by weight or more and 0.5 parts by weight or less, or it may be 0.01 part by weight or more and 0.46 parts by weight or less. In a case where the electrode layer is the positive electrode layer, the content of the imidazoline-based dispersion material may be, for example, 0.01 part by weight or more and 0.25 parts by weight or less, or it may be 0.01 part by weight or more and 0.135 parts by weight or less.

In the electrode layer, the content of the imidazoline-based dispersion material is, for example, 0.1 parts by weight or more and 5 parts by weight or less, and it may be 0.5 parts by weight or more and 3 parts by weight or less or may be 1 part by weight or more and 2 parts by weight or less in a case where the content of the sulfide solid electrolyte is set to 100 parts by weight. The proportion of the imidazoline-based dispersion material in the electrode layer is, for example, 0.005% by volume or more and 0.5% by volume or less.

2. Sulfide Solid Electrolyte

The electrode layer in the present disclosure contains a sulfide solid electrolyte. The sulfide solid electrolyte constitutes an ion conduction path in the electrode layer. Examples of the shape of the sulfide solid electrolyte include a particle shape. In the present disclosure, the average particle diameter ($D_{50}$) of the sulfide solid electrolyte is generally less than 1 μm. The average particle diameter ($D_{50}$) of the sulfide solid electrolyte may be 0.95 μm or less or may be 0.9 μm or less. On the other hand, the average particle diameter ($D_{50}$) of the sulfide solid electrolyte is, for example, 0.01 μm or more, and it may be 0.1 μm or more. The average particle diameter ($D_{50}$) represents a particle diameter (a median diameter) of 50% accumulation of the cumulative particle size distribution, and the average particle diameter is calculated from, for example, the measurement by a laser diffraction type particle size distribution meter or a scanning electron microscope (SEM).

The sulfide solid electrolyte generally contains sulfur(S) as the main component of the anionic elements. The sulfide solid electrolyte contains, for example, Li, A (A is at least one of P, As, Sb, Si, Ge, Sn, B, Al, Ga, and In), and S. A preferably contains at least P, and the sulfide solid electrolyte may contain at least one of Cl, Br, and I as a halogen. Further, the sulfide solid electrolyte may contain O.

The sulfide solid electrolyte may be a glass-based sulfide solid electrolyte, may be a glass-ceramic-based sulfide solid electrolyte, or may be a crystalline sulfide solid electrolyte. In a case where the sulfide solid electrolyte has a crystal phase, examples of the crystal phase thereof include a Thio-LISICON-type crystal phase, an LGPS-type crystal phase, and an argyrodite-type crystal phase.

The composition of the sulfide solid electrolyte is not particularly limited. However, examples thereof include $xLi_2S\cdot(100-x)P_2S_5$ ($70 \le x \le 80$) and $yLiI\cdot zLiBr\cdot(100-y-z)(xLi_2S\cdot(1-x)P_2S_5)$($0.7 \le x \le 0.8$, $0 \le y \le 30$, $0 \le z \le 30$).

The sulfide solid electrolyte may have a composition represented by the general formula: $Li_{4-x}Ge_{1-x}P_xS_4$ ($0<x<1$). In the above general formula, at least a part of Ge may be substituted with at least one of Sb, Si, Sn, B, Al, Ga, In, Ti, Zr, V, and Nb. In the above general formula, at least a part of P may be substituted with at least one of Sb, Si, Sn, B, Al, Ga, In, Ti, Zr, V, and Nb. In the above general formula, a part of Li may be substituted with at least one of Na, K, Mg, Ca, and Zn. In the above general formula, a part of S may be substituted with a halogen (at least one of F, Cl, Br, and I).

Examples of other compositions of the sulfide solid electrolyte include $Li_{7-x-2y}PS_{6-x-y}X_y$, $Li_{8-x-2y}SiS_{6-x-y}X_y$, and $Li_{8-x-2y}GeS_{6-x-y}X_y$. In these compositions, X is at least one of F, Cl, Br, and I, and x and y respectively satisfy $0 \le x$ and $0 \le y$.

The sulfide solid electrolyte preferably has high Li ion conductivity. The Li ion conductivity of the sulfide solid electrolyte at 25° C. is, for example, $1\times 10^{-4}$ S/cm or more, and it is preferably $1\times 10^{-3}$ S/cm or more. The sulfide solid electrolyte preferably has high insulating properties. The electron conductivity of the sulfide solid electrolyte at 25° C. is, for example, $10^{-6}$ S/cm or less, and it may be $10^{-8}$ S/cm or less or may be $10^{-10}$ S/cm or less.

The proportion of the sulfide solid electrolyte in the electrode layer is, for example, 15% by volume or more and 75% by volume or less, and it may be 15% by volume or more and 60% by volume or less. In a case where the proportion of the sulfide solid electrolyte is low, there is a possibility that the ion conduction path is not formed sufficiently. On the other hand, in a case where the proportion of the sulfide solid electrolyte is high, there is a possibility that the volumetric energy density is reduced.

The proportion of the electrode active material to the total of the electrode active material and the sulfide solid electrolyte is, for example, 40% by volume or more and 80% by volume or less, and it may be 50% by volume or more and 80% by volume or less or may be 60% by volume or more and 70% by volume or less. In a case where the proportion of the electrode active material is small, there is a possibility that the volumetric energy density is not reduced. On the other hand, in a case where the proportion of the electrode active material is large, there is a possibility that the ion conduction path is not formed sufficiently.

The proportion of the total of the electrode active material and the sulfide solid electrolyte in the electrode layer is, for example, 75% by volume or more and less than 100% by volume, and it may be 80% by volume or more and less than 100% by volume or may be 90% by volume or more and less than 100% by volume.

3. Binder

The electrode layer in the present disclosure may contain a binder. Examples of the binder include rubber-based binders, such as butadiene rubber, hydrogenated butadiene rubber, styrene butadiene rubber (SBR), hydrogenated styrene butadiene rubber, nitrile butadiene rubber, hydrogenated nitrile butadiene rubber, and ethylene propylene rubber; and fluorine-based binders, such as polyvinylidene fluoride (PVDF) and polytetrafluoroethylene (PTFE).

Here, in a case where the distance Ra calculated from the Hansen solubility parameter (HSP) is taken into consideration, the distance Ra1 between the sulfide solid electrolyte and the imidazoline-based dispersion material is preferably smaller than the distance Ra2 between the sulfide solid electrolyte and the binder. It is because it is easy to obtain the dispersion effect of the sulfide solid electrolyte due to the imidazoline-based dispersion material. The difference between Ra2 and Ra1 is, for example, 0.5 $MPa^{1/2}$ or more, and it may be 1.0 $MPa^{12}$ or more. Further, in a case of comparing, for example, a rubber-based binder and a fluorine-based binder, the rubber-based binder has a low affinity for the sulfide solid electrolyte as compared with the fluorine-based binder, and thus it is easy to obtain the dispersion effect of the sulfide solid electrolyte due to the imidazoline-based dispersion material.

The proportion of the binder in the electrode layer is, for example, 1% by volume or more and 20% by volume or less, and it may be 5% by volume or more and 20% by volume or less.

4. Electrode Active Material

The electrode layer in the present disclosure contains an electrode active material. The electrode active material may be a positive electrode active material or may be a negative electrode active material.

Here, in a case where the distance Ra calculated from the Hansen solubility parameter (HSP) is taken into consideration, the distance Ra3 between the electrode active material and the imidazoline-based dispersion material is preferably smaller than the distance Ra4 between the electrode active material and the binder. It is because it is easy to obtain the dispersion effect of the electrode active material due to the imidazoline-based dispersion material. The difference between Ra4 and Ra3 is, for example, 0.5 $MPa^{1/2}$ or more, and it may be 1.0 $MPa^{1/2}$ or more. Further, in a case of comparing, for example, a rubber-based binder and a fluorine-based binder, the rubber-based binder has a low affinity for the electrode active material as compared with the fluorine-based binder, and thus it is easy to obtain the dispersion effect of the electrode active material due to the imidazoline-based dispersion material.

Examples of the electrode active material include a transition metal oxide-based active material, a Si-based active material, and a carbon-based active material. The transition metal oxide-based active material is generally an active material having Li, M (M is one or more kinds of transition metal elements), and O. The transition metal element is a metal element belonging to any of Group 3 to Group 11 of the periodic table, and examples thereof include Ni, Co, Mn, Fe, Ti, and V. A part of M may be replaced by a metal element (for example, Al) belonging to any of Group 12 to Group 14 of the periodic table. The transition metal oxide-based active material preferably has a crystal phase. Examples of the crystal phase include a rock salt layer-type crystal phase and a spinel-type crystal phase.

An example of the transition metal oxide-based active material includes an active material represented by $LiMe_{1-x}Al_xO_2$ (Me is at least one of Ni, Co, and Mn, and x satisfies $0 \leq x < 1$). Specific examples of such an active material include $LiNiO_2$, $LiCoO_2$, $LiMnO_2$, $Li(Ni, Co, Mn)O_2$, and $Li(Ni, Co, Al)O_2$. Another example of the transition metal oxide-based active material includes an active material represented by $LiMe_2O_4$ (Me is at least one of Ni, Co, and Mn). Specific examples of such an active material include $LiMn_2O_4$ and $Li(Ni_{0.5}Mn_{1.5})O_4$.

Another example of the transition metal oxide-based active material includes lithium titanate. Lithium titanate (LTO) is a compound containing Li, Ti, and O. Examples of the composition of the lithium titanate include $Li_xTi_yO_z$ ($3.5 \leq x \leq 4.5$, $4.5 \leq y \leq 5.5$, and $11 \leq z \leq 13$). x may be 3.7 or more and 4.3 or less, or it may be 3.9 or more and 4.1 or less. y may be 4.7 or more and 5.3 or less, or it may be 4.9 or more and 5.1 or less. z may be 11.5 or more and 12.5 or less, or it may be 11.7 or more and 12.3 or less. Lithium titanate preferably has a composition represented by $Li_4Ti_5O_{12}$.

The Si-based active material is an active material containing at least Si, and examples thereof include a Si single body, a Si alloy, and silicon oxide (SiO). The Si alloy preferably contains Si as a main component. In addition, the carbon-based active material is an active material containing carbon (C) as a main component, and examples thereof include graphite and hard carbon.

In a case where the electrode active material is the positive electrode active material, the surface of the positive electrode active material is preferably coated with an ion conductive oxide. It is because it is possible to suppress the reaction between the positive electrode active material and the sulfide solid electrolyte to form a high resistance layer. Examples of the ion conductive oxide include $LiNbO_3$. The thickness of the ion conductive oxide is, for example, 1 nm or more and 30 nm or less.

Examples of the shape of the electrode active material include a particle shape. The average particle diameter ($D_{50}$) of the electrode active material is, for example, 10 nm or more and 50 nm or less, and it may be 100 nm or more and 20 μm or less.

The proportion of the electrode active material in the electrode layer is, for example, 20% by volume or more and 80% by volume or less, and it may be 30% by volume or more and 70% by volume or less, or may be 40% by volume or more and 65% by volume or less. In a case where the proportion of the electrode active material is small, there is a possibility that the volumetric energy density is not reduced. On the other hand, in a case where the proportion of the electrode active material is large, there is a possibility that the ion conduction path is not formed sufficiently.

5. Electrode Layer

The electrode layer in the present disclosure contains the electrode active material, the sulfide solid electrolyte, and the imidazoline-based dispersion material, which are described above. The electrode layer may be a positive electrode layer or may be a negative electrode layer.

The electrode layer in the present disclosure may contain a conductive material. Examples of the conductive material include a carbon material, a metal particle, and a conductive polymer. Examples of the carbon material include particle-shaped carbon materials, acetylene black (AB) and Ketjen black (KB), and fiber-shaped carbon materials, such as carbon fiber, carbon nanotube (CNT), and carbon nanofiber (CNF). The proportion of the conductive material in the electrode layer is, for example, 0.1% by volume or more and 10% by volume or less, and it may be 0.3% by volume or more and 10% by volume or less. The thickness of the electrode layer is, for example, 0.1 μm or more and 1000 μm or less.

A method of manufacturing the electrode layer in the present disclosure is not particularly limited. In the present disclosure, it is also possible to provide a method of manufacturing an electrode layer, which is a method of manufacturing an electrode layer that is used in an all-solid state battery and includes a preparation step of preparing a paste containing an electrode active material, a sulfide solid electrolyte having average particle diameter $D_{50}$ of less than 1 μm, an imidazoline-based dispersion material, and a dispersion medium, a coating step of applying the paste to form a coating layer, and a drying step of drying the coating layer to remove the dispersion medium. The paste may further contain a conductive material. The method of applying the paste is not particularly limited, and examples thereof include a blade method. The drying temperature of the coating layer is, for example, 80° C. or higher and 120° C. or lower. The drying time of the coating layer is, for example, 10 minutes or more and 5 hours or less.

B. All-solid State Battery

FIG. 1 is a schematic cross-sectional view exemplarily illustrating an all-solid state battery in the present disclosure. An all-solid state battery 10 illustrated in FIG. 1 has a positive electrode layer 1, a negative electrode layer 2, a solid electrolyte layer 3 arranged between the positive electrode layer 1 and the negative electrode layer 2, a positive electrode current collector 4 that collects current from the positive electrode layer 1, and a negative electrode current collector 5 that collects current from the negative electrode layer 2. In the present disclosure, at least one of the positive electrode layer 1 and the negative electrode layer 2 is the electrode layer described in "A. Electrode Layer" described above.

According to the present disclosure, since the above-described electrode layer is used, an all-solid state battery having a low internal resistance is obtained.

1. Positive Electrode Layer and Negative Electrode Layer

Since the positive electrode layer and the negative electrode layer in the present disclosure are the same as those described in "A. Electrode Layer" described above, the description thereof is omitted here. In the present disclosure, any one of the following cases may be good; (i) the positive electrode layer corresponds to the above-described electrode layer, but the negative electrode layer does not correspond to the above-described electrode layer, (ii) the positive electrode layer does not correspond to the above-described electrode layer, but the negative electrode layer corresponds to the above-described electrode layer, or (iii) both the positive electrode layer and the negative electrode layer correspond to the above-mentioned electrode layer.

2. Solid Electrolyte Layer

The solid electrolyte layer in the present disclosure is arranged between the positive electrode layer and the negative electrode layer. The solid electrolyte layer contains at least a solid electrolyte and may further contain a binder. Since the solid electrolyte and the binder are the same as those described in "A. Electrode Layer" described above, the description thereof is omitted here. The thickness of the solid electrolyte layer is, for example, 0.1 μm or more and 1,000 μm or less.

3. All-Solid State Battery

In the present disclosure, the "all-solid state battery" refers to a battery equipped with a solid electrolyte layer (at least a layer containing a solid electrolyte). Further, the all-solid state battery in the present disclosure includes a power generation element that has a positive electrode layer, a solid electrolyte layer, and a negative electrode layer. The power generation element generally has a positive electrode current collector and a negative electrode current collector. The positive electrode current collector is arranged, for example, on the surface of the positive electrode layer on a side opposite to the solid electrolyte layer. Examples of the material of the positive electrode current collector include metals, such as aluminum, SUS, and nickel. Examples of the shape of the positive electrode current collector include a foil shape and a mesh shape. On the other hand, the negative electrode current collector is arranged, for example, on the surface of the negative electrode layer on a side opposite to the solid electrolyte layer. Examples of the material of the negative electrode current collector include metals, such as copper, SUS, and nickel. Examples of the shape of the negative electrode current collector include a foil shape and a mesh shape.

The all-solid state battery in the present disclosure may include an exterior body that houses the power generation element. Examples of the exterior body include a laminate-type exterior body and a case-type exterior body. Further, the all-solid state battery in the present disclosure may be equipped with a restraining jig that applies a restraining pressure in the thickness direction to the power generation element. A known jig can be used as the restraining jig. The restraining pressure is, for example, 0.1 MPa or more and 50 MPa or less, and it may be 1 MPa or more and 20 MPa or less. In a case where the restraining pressure is small, there is a possibility that a good ion conduction path and a good electron conduction path are not formed. On the other hand, in a case where the restraining pressure is large, there is a possibility that the size of the restraining jig becomes large and thus the volumetric energy density is reduced.

The kind of the all-solid state battery in the present disclosure is not particularly limited; however, it is typically a lithium ion secondary battery. The use application of the all-solid state battery is not particularly limited. However, examples thereof include a power source for a vehicle, such as a hybrid electric vehicle (HEV), a plug-in hybrid electric vehicle (PHEV), a battery electric vehicle (BEV), a gasoline vehicle, or a diesel vehicle. In particular, it is preferably used as a power source for driving a hybrid electric vehicle, a plug-in hybrid electric vehicle, or a battery electric vehicle. Further, the all-solid state battery in the present disclosure may be used as a power source for a moving body (for example, a railway, a ship, or an aircraft) other than the vehicle or may be used as a power source for an electric product, such as an information processing device.

It is noted that the present disclosure is not limited to the above embodiment. The above embodiment is an example, and thus any of those having substantially the same configuration and having the same action or effect as the technical idea described in the claims of the present disclosure is included in the technical scope of the present disclosure.

Example 1

Preparation of Negative Electrode Paste

A $Li_4Ti_5O_{12}$ particle (LTO, density: 3.5 g/cc) was used as the negative electrode active material. The weighing was carried out so that with respect to 100 parts by weight of this negative electrode active material (LTO), a conductive material (VGCF, density: 2 g/cc) was 1.1 parts by weight, a sulfide solid electrolyte (10LiI·15LiBr·75 ($0.75Li_2S \cdot 0.25P_2S_5$), average particle diameter $D_{50}$: 0.9 μm, density: 2 g/cc) was 33.6 parts by weight, a binder (an SBR-based binder) was 1.42 parts by weight, and a dispersion material (an imidazoline-based dispersion material, 1-hydroxyethyl-2-alkenylimidazoline) was 0.46 parts by weight. A dispersion medium (tetralin) was added to a mixture of these, the solid content was adjusted to 53% by weight, and the resultant mixture was mixed using an ultrasonic homogenizer (UH-50 manufactured by SMT Co., Ltd.). As a result, a negative electrode paste was obtained.

Preparation of Positive Electrode Paste

As the positive electrode active material, $LiNi_{0.8}Co_{0.15}Al_{0.05}$ (NCA, density: 4.65 g/cc) subjected to a surface treatment with $LiNbO_3$ was used. The weighing was carried out so that with respect to 100 parts by weight of this positive electrode active material (NCA), a conductive material (VGCF, density: 2 g/cc) was 2.4 parts by weight, a conductive material (acetylene black) was 0.3 parts by weight, a sulfide solid electrolyte (10LiI·15LiBr·75 ($0.75Li_2S \cdot 0.25P_2S_5$), average particle diameter $D_{50}$: 0.9 μm, density: 2 g/cc) was 25.6 parts by weight, and a binder (an SBR-based binder) was 0.42 parts by weight. A dispersion medium (tetralin) was added to a mixture of these, the solid content was adjusted to 65% by weight, and the resultant mixture was mixed using an ultrasonic homogenizer (UH-50 manufactured by SMT Co., Ltd.). As a result, a positive electrode paste was obtained.

Preparation of SE Layer Paste

A dispersion medium (heptane), a binder (a heptane solution containing 5% by mass of a butadiene rubber-based binder), and a sulfide solid electrolyte ($LiI—LiBr—Li_2S—P_2S_5$-based glass ceramic, average particle diameter $D_{50}$: 2.5 μm) were added in a polypropylene container and mixed for 30 seconds by using an ultrasonic homogenizer (UH-50, manufactured by SMT Co., Ltd.). Next, the container was shaken with a shaker for 3 minutes. As a result, a paste for a solid electrolyte layer (a paste for an SE layer) was obtained.

Production of All-solid State Battery

First, the positive electrode paste was applied onto a positive electrode current collector (an aluminum foil, thickness: 15 μm) by a blade method using an applicator. After coating, drying was carried out on a hot plate at 100° C. for 30 minutes. As a result, a positive electrode having a positive electrode current collector and a positive electrode layer were obtained. Next, the negative electrode paste was applied onto a negative electrode current collector (nickel foil, thickness: 22 μm). After coating, drying was carried out on a hot plate at 100° C. for 30 minutes. As a result, a negative electrode having a negative electrode current collector and a negative electrode layer were obtained. Here, the weight per unit area of the negative electrode layer was adjusted so that the specific charging capacity of the negative electrode was 1.1 times in a case where the specific charging capacity of the positive electrode is set to 200 mAh/g.

Next, the positive electrode was pressed. The surface of the positive electrode layer after pressing was coated with the SE layer paste using a die coater and dried on a hot plate at 100° C. for 30 minutes. Then, roll pressing was carried out at a linear pressure of 2 tons/cm. As a result, a positive electrode side laminate having a positive electrode current collector, a positive electrode layer, and a solid electrolyte layer was obtained. Next, the negative electrode was pressed. The surface of the negative electrode layer after pressing was coated with the SE layer paste using a die coater and dried on a hot plate at 100° C. for 30 minutes. Then, roll pressing was carried out at a linear pressure of 2 tons/cm. As a result, a negative electrode side laminate including a negative electrode current collector, a negative electrode layer, and a solid electrolyte layer was obtained.

The positive electrode side laminate and the negative electrode side laminate were each subjected to punch processing and arranged so that the solid electrolyte layers faced each other, and an unpressed solid electrolyte layer was arranged between them. Then, roll pressing was carried out at 160° C. with a linear pressure of 2 tons/cm to obtain a power generation element having a positive electrode, a solid electrolyte layer, and a negative electrode in this order. The obtained power generation element was laminated and enclosed and then restrained at 5 MPa to obtain an all-solid state battery

Example 2 and Comparative Examples 1 and 2

An all-solid state battery was produced in the same manner as in Example 1 except that the average particle diameter ($D_{50}$) of the sulfide solid electrolyte used in the negative electrode layer was changed as shown in Table 1.

Evaluation

Ion Conductivity Measurement

An evaluation cell was produced using each of the negative electrode pastes produced in Examples 1 and 2 and Comparative Examples 1 and 2. Specifically, the negative electrode paste was applied onto the aluminum foil and then dried on a hot plate at 100° C. for 30 minutes to prepare an electrode. Next, lithium foils were arranged on both sides of the electrode to produce electrode structure bodies. Next, the two electrode structure bodies were superposed to face each other and subjected to roll pressing at a linear pressure of 5 tons/cm. Next, the obtained laminate was punched out, the thickness of the negative electrode layer was measured, lamination and enclosing were carried out, and restraining was carried out at 5 MPa to obtain an evaluation cell (a symmetrical cell). The current value in a case where a constant voltage of −0.1 V to +0.1 V was applied to the obtained evaluation cell was measured, and the resistance was calculated according to the Ohm's law. The ion conductivity of the negative electrode layer was determined from the obtained resistance and the thickness of the negative electrode layer. The results are shown in Table 1.

Resistance Measurement

The charging resistance of the all-solid state batteries produced in Examples 1 and 2 and Comparative Examples 1 and 2 was measured. Specifically, each all-solid state battery was charged at a constant current mode with a current equivalent to 1 C, charged at a constant voltage mode after the cell voltage reached 2.7 V, and then the charging was terminated at the time in a case where the charging current reached a value equivalent to 0.01 C. Then, it was discharged at a constant current mode with a current equivalent to 1 C, and the discharging was terminated at the time in a case where the voltage reached 1.5 V. This discharging was repeated twice, and the discharge capacity in the second cycle was measured. Next, charging was carried out, at a constant current mode with a current equivalent to 1 C, to half the capacity of the discharge capacity in the second cycle, and the SOC of the all-solid state battery was adjusted to 50%. Next, the all-solid state battery having a SOC of 50% was charged at a constant current mode with a current equivalent to 41 C, and the voltage before charging and the voltage 5 seconds after the start of charging were measured. The charging resistance (in terms of direct current resistance) was obtained by dividing the difference between these voltages by a current equivalent to 41 C. The results are shown in Table 1. It is noted that the charging resistance in Table 1 is a relative value in a case where the charging resistance of Comparative Example 1 is set to 1.

TABLE 1

| | Average particle diameter ($D_{50}$) of sulfide solid electrolyte (μm) | Ion conductivity of negative electrode layer (mS/cm) | Charging resistance (relative value) |
|---|---|---|---|
| Example 1 | 0.9 | 0.05 | 0.63 |
| Example 2 | 0.6 | 0.05 | 0.58 |
| Comparative Example 1 | 1.0 | 0.06 | 1 |
| Comparative Example 2 | 2.2 | 0.06 | 1.03 |

As shown in Table 1, in Examples 1 and 2 and Comparative Examples 1 and 2, the ion conductivity of the negative electrode layer was about the same level regardless of the average particle diameter ($D_{50}$) of the sulfide solid electrolyte. This suggests that the dispersibility of the sulfide solid electrolyte is about the same level. It is noted that since the LTO in the uncharged state generally does not have ion conductivity, the ion conductivity of the negative electrode layer depends on the ion conductivity and dispersibility of the sulfide solid electrolyte. On the other hand, in Examples 1 and 2, it was confirmed that the charging resistance is significantly reduced as compared with Comparative Examples 1 and 2. It is presumed to be because a good joining interface is formed at the interface between the negative electrode active material and the sulfide solid electrolyte, and thus the interface resistance is significantly reduced.

Example 3

A negative electrode paste was obtained in the same manner as in Example 1 except that no dispersion material was used. In addition, a positive electrode paste was obtained in the same manner as in Example 1 except that with respect to 100 parts by weight of the positive electrode active material (NCA), a dispersion material (an imidazoline-based dispersion material, 1-hydroxyethyl-2-alkenylimidazoline) was further added to be 0.01 parts by weight. It is noted that the proportion of the dispersion material in the solid content of the positive electrode paste was 0.0077% by volume. An all-solid state battery was produced in the same manner as in Example 1 except that these negative electrode paste and positive electrode paste were used.

Examples 4 to 6

An all-solid state battery was produced in the same manner as in Example 3 except that the addition ratio of the dispersion material in the positive electrode paste was changed as shown in Table 2.

Comparative Example 3

An all-solid state battery was produced in the same manner as in Example 3 except that no dispersion material was used in the positive electrode paste.

Example 7

An all-solid state battery was produced in the same manner as in Example 5 except that the binder in the positive electrode paste was changed from the SBR-based binder to a PVDF-based binder.

Comparative Example 4

An all-solid state battery was produced in the same manner as in Example 7 except that no dispersion material was used in the positive electrode paste.

Evaluation

The discharging resistance of the all-solid state batteries produced in Examples 3 to 7 and Comparative Examples 3 and 4 was measured. Specifically, the SOC of the all-solid state battery was adjusted to 50% in the same manner as described above. Next, the all-solid state battery having a SOC of 50% was discharged at a constant current mode with a current equivalent to 60 C, and the voltage before discharging and the voltage 2 seconds after the start of discharging were measured. The discharging resistance (in terms of direct current resistance) was obtained by dividing the difference between these voltages by a current equivalent to 60 C. The results are shown in Table 2 and FIG. 2. It is noted that the discharging resistance in Table 2 and FIG. 2 is a relative value in a case where the discharging resistance of Comparative Example 3 is set to 1.

TABLE 2

| | Addition ratio of dispersion material (wt % vs. NCA) | Addition ratio of dispersion material (vol %) | Binder | Discharging resistance (relative value) |
|---|---|---|---|---|
| Comparative Example 3 | 0 | 0 | SBR | 1 |
| Example 3 | 0.01 | 0.0077 | SBR | 0.985 |
| Example 4 | 0.05 | 0.037 | SBR | 0.944 |
| Example 5 | 0.1 | 0.074 | SBR | 0.817 |
| Example 6 | 0.135 | 0.0999 | SBR | 0.852 |
| Comparative Example 4 | 0 | 0 | PVdF | 1.034 |
| Example 7 | 0.1 | 0.074 | PVdF | 0.983 |

Figure 2:
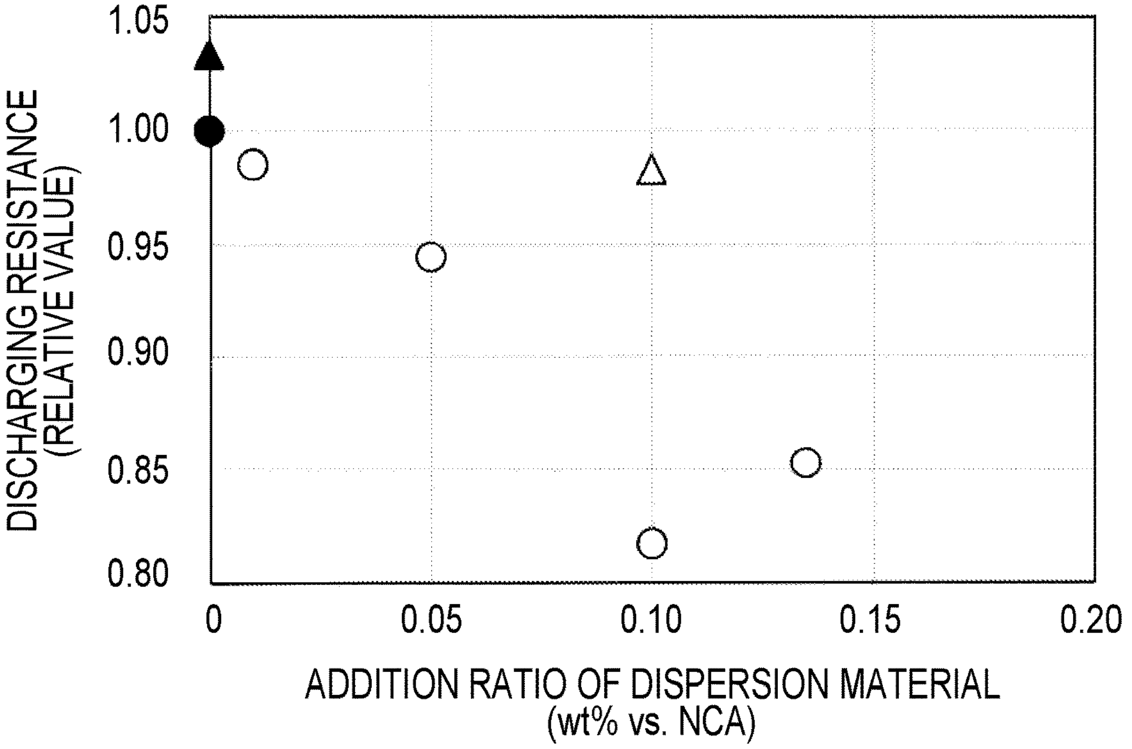
FIG. 2 is a graph showing the results of Examples 3 to 7 and Comparative Examples 3 and 4.

As shown in Table 2 and FIG. 2, it was confirmed that in Examples 3 to 6, the discharging resistance is reduced as compared with Comparative Example 3. Similarly, in Example 7, it was confirmed that the discharging resistance is reduced as compared with Comparative Example 4. It is presumed to be because a good joining interface is formed at the interface between the positive electrode active material and the sulfide solid electrolyte, and thus the interface resistance is significantly reduced. In particular, in a case where Example 5 and Example 7 were compared, it was confirmed that the discharging resistance is significantly reduced by using the rubber-based binder.

Example 8

A negative electrode paste was produced in the same manner as in Example 1.

Example 9

A negative electrode paste was produced in the same manner as in Example 8 except that a PVDF-based binder was used instead of the SBR-based binder.

Evaluation

The permeability of the mesh filter was evaluated using the pastes prepared in Examples 8 and 9. Specifically, a mesh filter made of SUS, having an opening size of 40 μm, was used. As a result of the evaluation, the permeability of the filter in Example 8 was high as compared with Example 9. The reason for the above result was considered from the viewpoint of the distance Ra calculated from the Hansen solubility parameter (HSP). For example, the distance Ra between the imidazoline-based dispersion material and the sulfide solid electrolyte (SE) was 10.7 $MPa^{1/2}$. In the same manner, the distance Ra between individual materials was calculated, which is shown in Table 3.

TABLE 3

| | Imidazoline-based dispersion material | SBR-based binder | PVDF-based binder |
|---|---|---|---|
| SE | 10.7 | 11.6 | 3.8 |
| LTO | 11.7 | 13.4 | 6.0 |

As shown in Table 3, the distance Ra between the imidazoline-based dispersion material and the sulfide solid electrolyte (SE) is smaller than the distance Ra between the SBR-based binder and the sulfide solid electrolyte (SE), and larger than the distance Ra between the PVDF-based binder and the sulfide solid electrolyte (SE). Since the smaller the distance Ra is, the higher the affinity of each material is, it was suggested that the PVDF-based binder has a high affinity to the sulfide solid electrolyte (SE) as compared with the imidazoline-based dispersion material and aggregation is likely to occur. On the other hand, the SBR-based binder has a low affinity to the sulfide solid electrolyte (SE) as compared with the imidazoline-based dispersion material. As a result, it is presumed that the dispersion effect of the sulfide solid electrolyte (SE) due to the imidazoline-based dispersion material is remarkably exhibited. A similar relationship was suggested in the negative electrode active material (LTO). In addition, the distance Ra between the imidazoline-based dispersion material and the active material was calculated. The results are shown in Table 4.

TABLE 4

| | LTO | Si | NCM | C (graphene) |
|---|---|---|---|---|
| Distance Ra with respect to dispersion material | 11.7 | 9.8 | 10.0 | 16.1 |

As shown in Table 4, the affinity of Si to the imidazoline-based dispersion material is high as compared with that to the LTO. As a result, it was suggested that the same effect as in Example 1 is obtained. A similar tendency was suggested in $LiNi_{1/3}Co_{1/3}Mn_{1/3}O_2$ (NCM). On the other hand, the affinity of C (graphene) to the imidazoline-based dispersion material was low as compared with that to the LTO. However, as a result of calculating Ra regarding a hydrophilic moiety and a hydrophobic moiety, which are generally contained in the imidazoline-based dispersion material, it was suggested that the same effect as in Example 1 is obtained in the case of C (graphene) since the distance between the hydrophilic moiety of the imidazoline-based dispersion material and C (graphene) was 12.5 $MPa^{1/2}$.

What is claimed is:

1. An electrode layer for an all-solid state battery, the electrode layer comprising:
- an electrode active material;
- a sulfide solid electrolyte;
- an imidazoline-based dispersion material; and
- a rubber-based binder,
- wherein:
  - the sulfide solid electrolyte has an average particle diameter of 0.6 μm or more and 0.9 μm or less;
  - the electrode layer contains 1-hydroxyethyl-2-alkenylimidazoline;
  - a first distance calculated from Hansen solubility parameters of the sulfide solid electrolyte and the imidazoline-based dispersion material is smaller than a second distance calculated from Hansen solubility parameters of the sulfide solid electrolyte and the rubber-based binder;
  - a difference between the first distance and the second distance is 0.5 $MPa^{1/2}$ or more; and
  - the electrode layer is a negative electrode laver.

2. The electrode layer according to claim 1, wherein the electrode active material contains at least one of a transition metal oxide-based active material, a Si-based active material, and a carbon-based active material.

3. The electrode layer according to claim 1, wherein:
- the electrode layer is a positive electrode layer;
- the electrode active material is $LiNi_{0.8}Co_{0.15}Al_{0.05}O_2$; and
- a content of 1-hydroxyethyl-2-alkenylimidazoline is 0.01 parts by weight to 0.135 parts by weight with respect to 100 parts by weight of $LiNi_{0.8}Co_{0.15}Al_{0.05}O_2$.

4. The electrode layer according to claim 1, wherein:
- the electrode active material is $Li_4Ti_5O_{12}$ particle; and
- a content of 1-hydroxyethyl-2-alkenylimidazoline is 0.46 parts by weight with respect to 100 parts by weight of $Li_4Ti_5O_{12}$ particle.

5. The electrode layer according to claim 1, wherein in the electrode layer, a content of 1-hydroxyethyl-2-alkenylimidazoline is 0.005 parts by weight or more and 0.5 parts by weight or less in a case where a content of the electrode active material is set to 100 parts by weight.

6. The electrode layer according to claim 5, wherein the electrode layer is a positive electrode layer, and the content of the 1-hydroxyethyl-2-alkenylimidazoline is 0.01 parts by weight or more and 0.135 parts by weight or less.

7. The electrode layer according to claim 1, wherein:
- the electrode layer further contains a binder and
- a distance calculated from Hansen solubility parameters of the electrode active material and 1-hydroxyethyl-2-alkenylimidazoline is smaller than a distance calculated from Hansen solubility parameters of the electrode active material and the binder.

8. An all-solid state battery comprising:
a positive electrode layer;
a negative electrode layer; and
a solid electrolyte layer arranged between the positive electrode layer and the negative electrode layer,
wherein at least one of the positive electrode layer and the negative electrode layer is the electrode layer according to claim 1.

9. The electrode layer according to claim 1, wherein the sulfide solid electrolyte has an average particle diameter of 0.6 μm.

10. The electrode layer according to claim 9, further comprising:
a conductive material; and
an SBR-based binder,
wherein:
the sulfide solid electrolyte is 10LiI·15LiBr·75 $(0.75Li_2S\cdot 0.25P_2S_5)$;
a content of the conductive material is 1.1 parts by weight with respect to 100 parts by weight of $Li_4Ti_5O_{12}$ particle;
a content of 10LiI·15LiBr·75 $(0.75Li_2S\cdot 0.25P_2S_5)$ is 3.6 parts by weight with respect to 100 parts by weight of $Li_4Ti_5O_{12}$ particle; and
a content of the SBR-based binder is 1.42 parts by weight with respect to 100 parts by weight of $Li_4Ti_5O_{12}$ particle.

11. The electrode layer according to claim 4, further comprising:
a conductive material; and
an SBR-based binder,
wherein:
the sulfide solid electrolyte has an average particle diameter of 0.9 μm;
the sulfide solid electrolyte is 10LiI·15LiBr·75 $(0.75Li_2S\cdot 0.25P_2S_5)$;
a content of the conductive material is 1.1 parts by weight with respect to 100 parts by weight of $Li_4Ti_5O_{12}$ particle;
a content of 10LiI·15LiBr·75 $(0.75Li_2S\cdot 0.25P_2S_5)$ is 3.6 parts by weight with respect to 100 parts by weight of $Li_4Ti_5O_{12}$ particle; and
a content of the SBR-based binder is 1.42 parts by weight with respect to 100 parts by weight of $Li_4Ti_5O_{12}$ particle.

12. The electrode layer according to claim 3, further comprising an SBR-based binder.

13. The electrode layer according to claim 1, wherein the content of 1-hydroxyethyl-2-alkenylimidazoline is 0.1 parts by weight or more and 0.135 parts by weight or less with respect to 100 parts by weight of $LiNi_{0.8}Co_{0.15}Al_{0.05}O_2$.

14. The electrode layer according to claim 13, wherein a content of the SBR-based binder is 0.42 parts by weight with respect to 100 parts by weight of $LiNi_{0.8}Co_{0.15}Al_{0.05}O_2$.

15. The electrode layer according to claim 14, wherein the content of 1-hydroxyethyl-2-alkenylimidazoline is 0.1 parts by weight with respect to 100 parts by weight of $LiNi_{0.8}Co_{0.15}Al_{0.05}O_2$.

* * * * *